April 21, 1931.  E. ROGAL ET AL  1,801,981
AUTOMATIC ACCOUNTING SYSTEM
Filed June 26, 1926   7 Sheets-Sheet 1
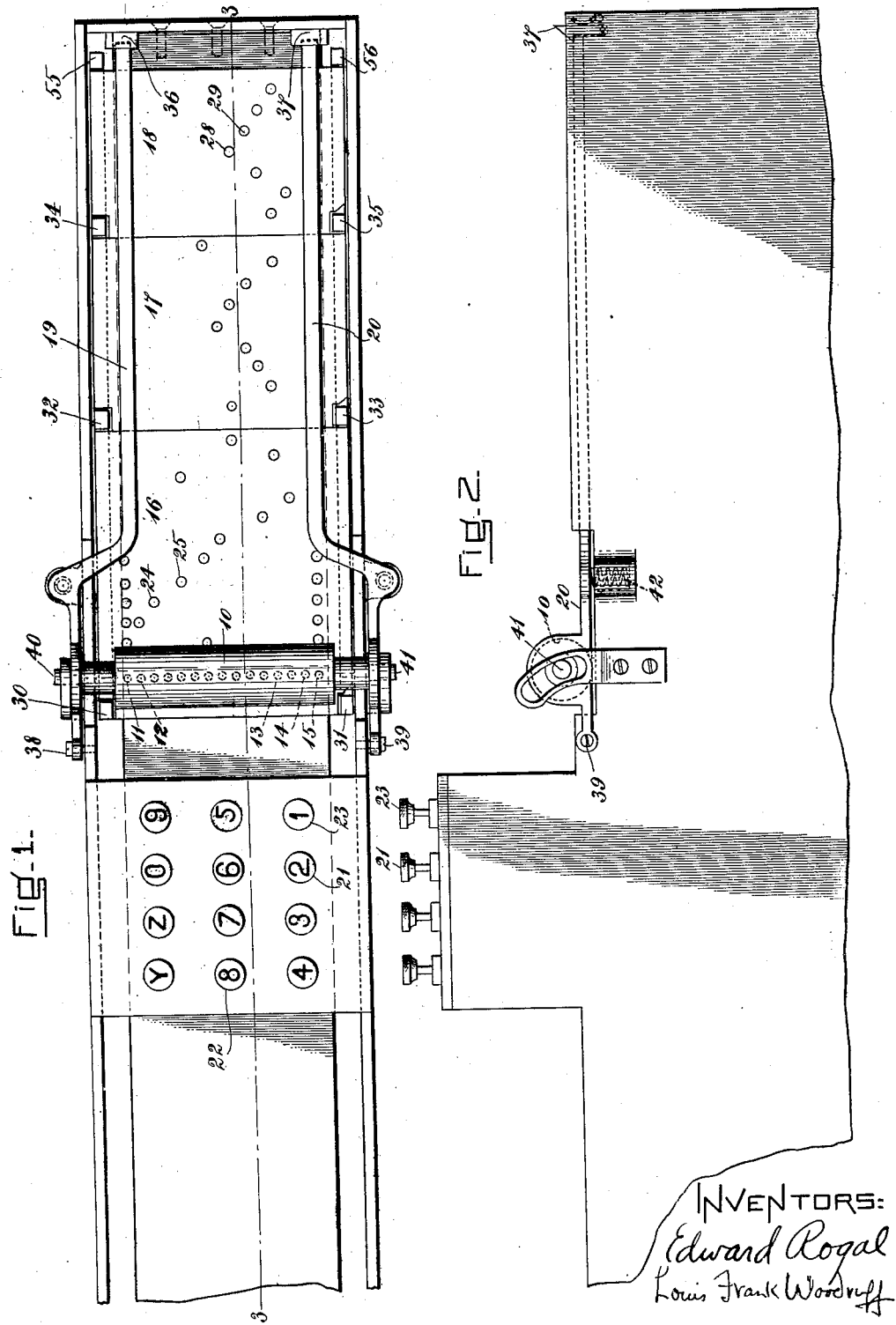
INVENTORS:
Edward Rogal
Louis Frank Woodruff

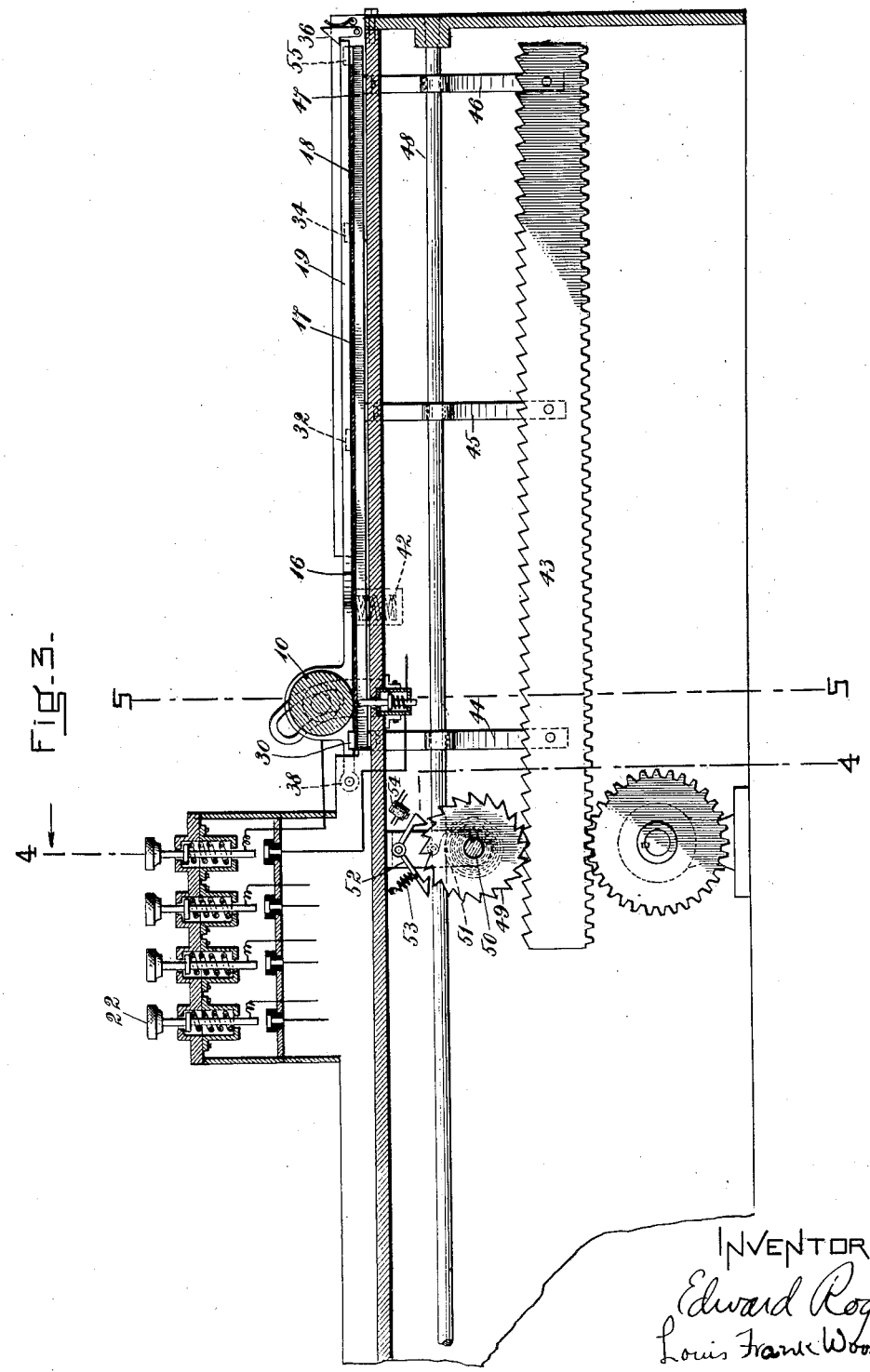

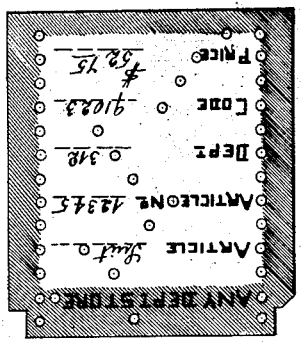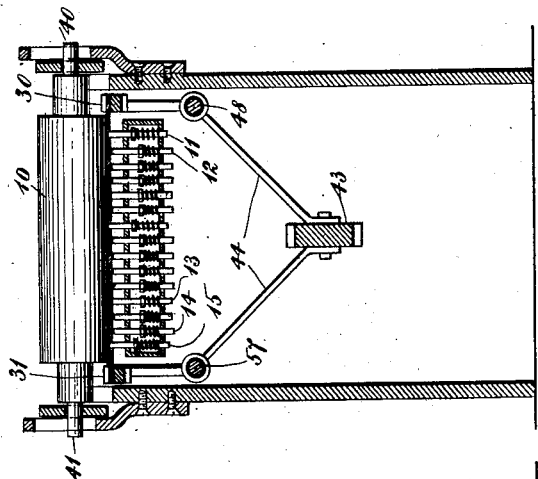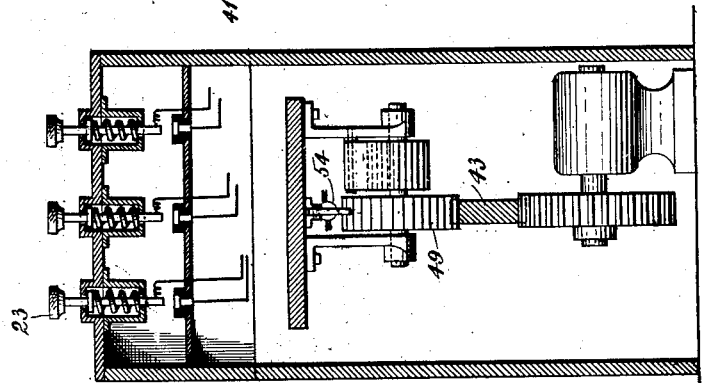

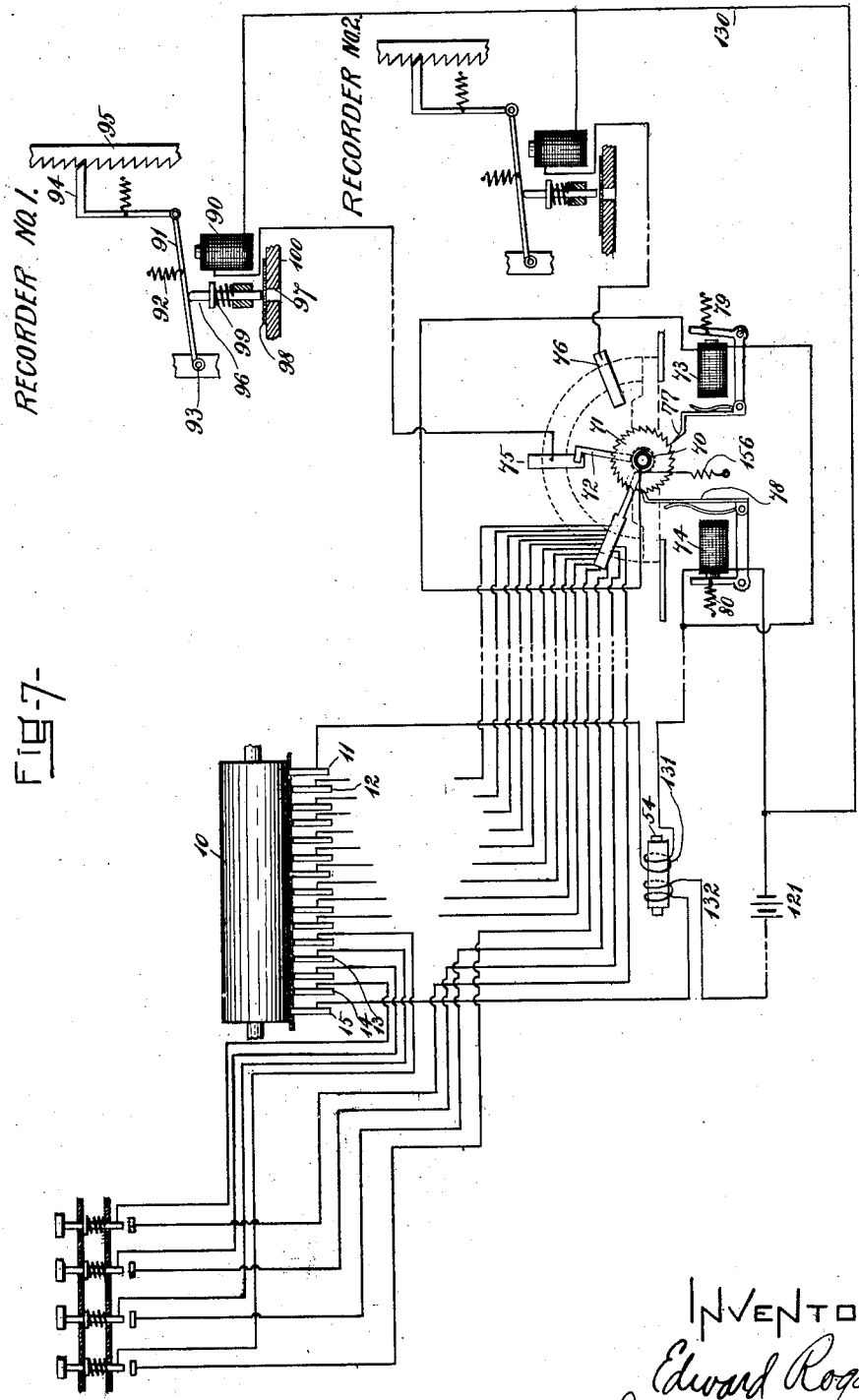

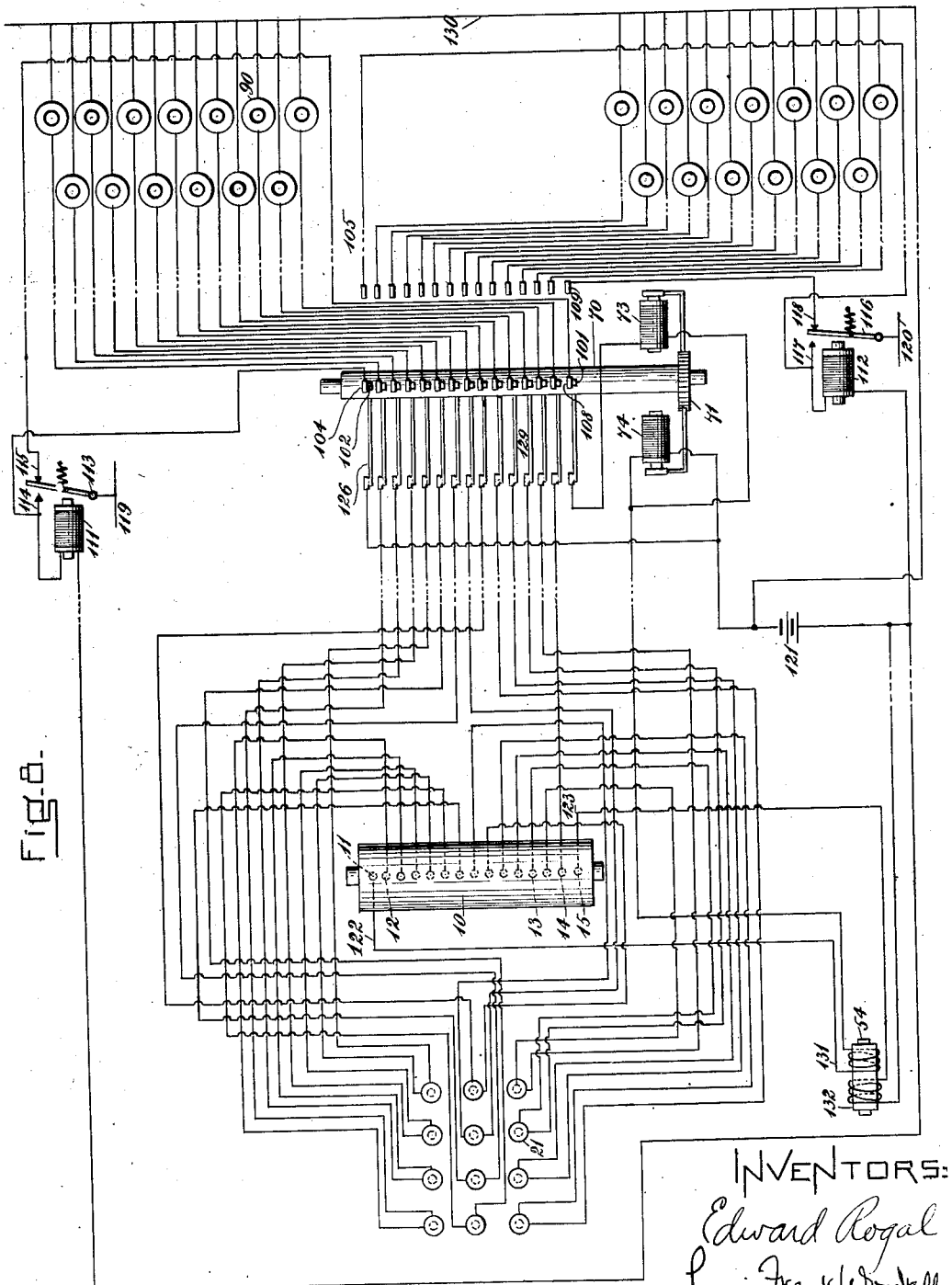

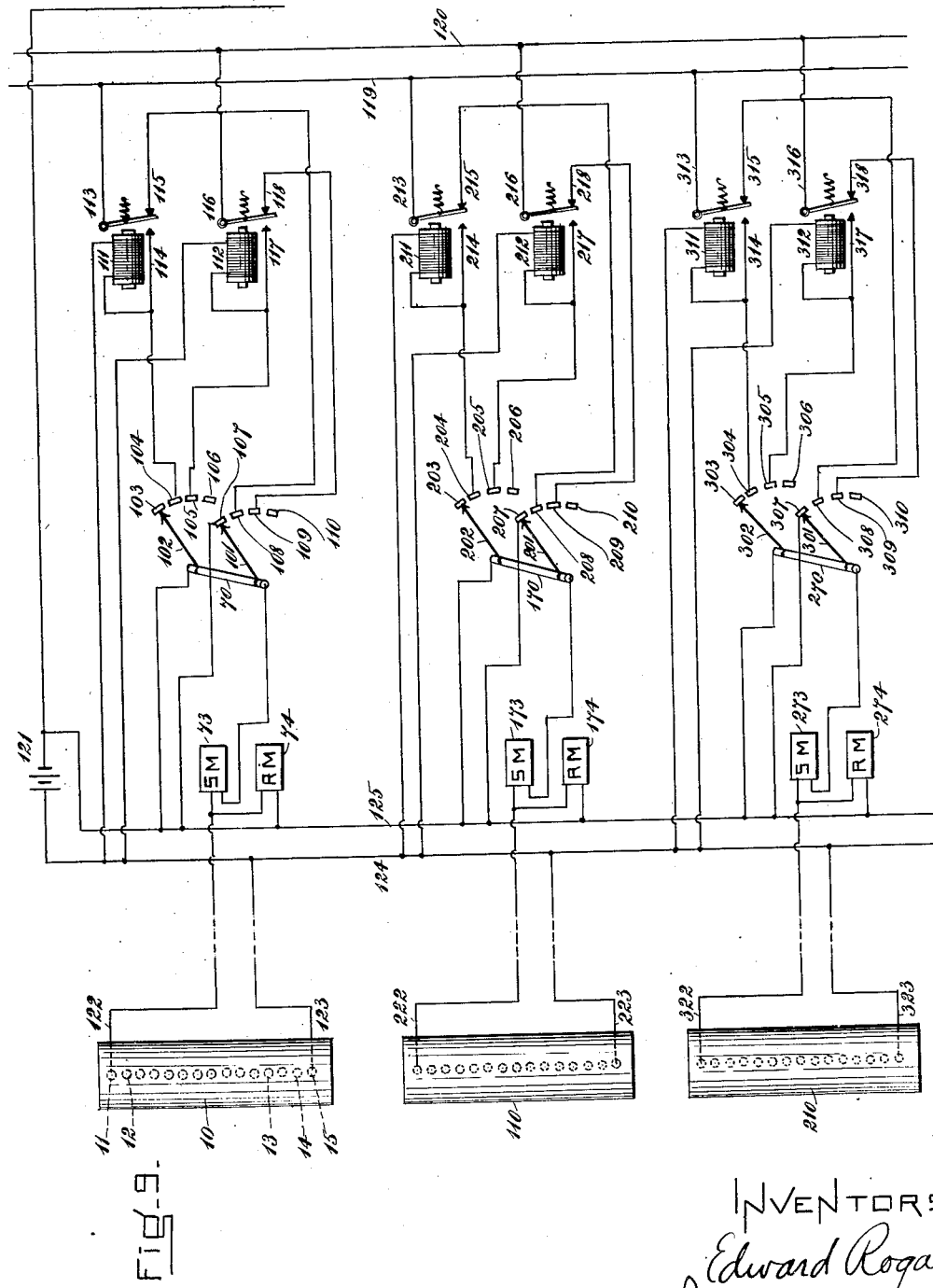

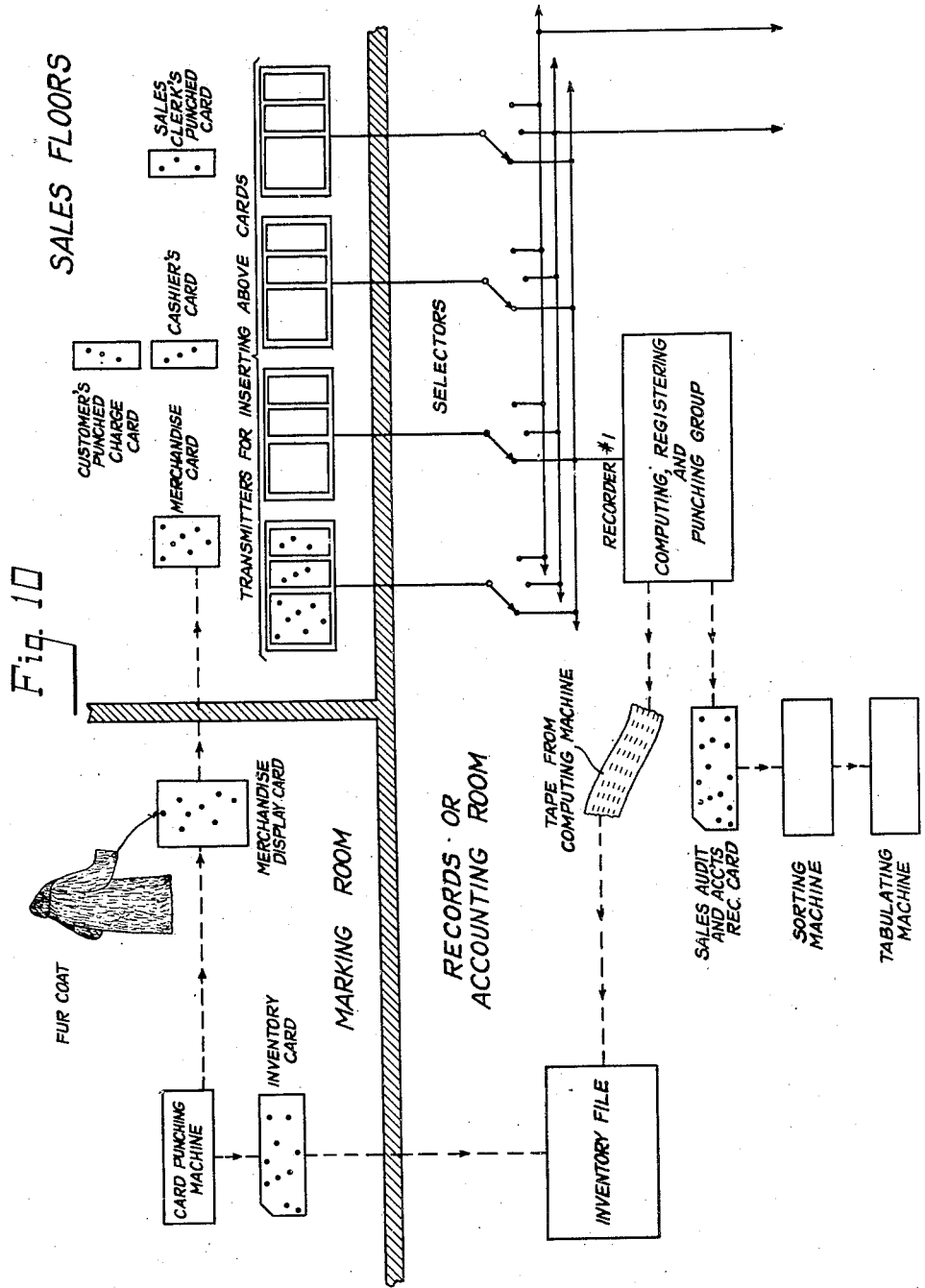

Patented Apr. 21, 1931

1,801,981

UNITED STATES PATENT OFFICE

EDWARD ROGAL, OF BROOKLINE, AND LOUIS FRANK WOODRUFF, OF BOSTON, MASSACHUSETTS, ASSIGNORS TO CENTRAL RECORDS, INC., OF CHICAGO, ILLINOIS, A CORPORATION OF DELAWARE

AUTOMATIC ACCOUNTING SYSTEM

Application filed June 26, 1926. Serial No. 118,793.

This invention relates to automatic accounting systems, designed particularly for use in department store accounting and merchandise control but readily applicable also to other uses.

Automatic sorters and tabulators using punched cards are well known, and have many applications in collating, sorting, computing and recording large masses of data. Earnest efforts have been made to apply this type of machinery to department store accounting and auditing problems, but thus far there has been little success, largely because it has been necessary to punch cards from data written on sales slips before the automatic sorters and tabulators could be used. The additional labor involved in punching these cards, and the delay in getting the completed data, has tended to offset any advantages derived.

One of the objects of our invention is to eliminate this disadvantage. Accordingly one feature of our invention relates to the production of punched cards at a distantly located records room, for brevity called the "central office", containing all necessary information relative to any transaction occurring on a sales floor, practically simultaneously with the transaction, or at least immediately upon its completion.

The apparatus employed comprises, in combination, a plurality of transmitting devices intended to be located at convenient places at or near the points where sales transactions occur, suitable electric circuits from these transmitting devices to a central office or group of offices, and selective devices, conveniently located at the central office, designed to connect the transmitting device in each case to a proper punching-registering-recording-computing-device for performing these operations, at the central office.

In the following description and claims the devices at the record room, whether they be single machines or groups of machines for performing the combined operations just named, or whether they be machines for performing any single operation useful to the accounting system, or for segregating a particular kind of sale as "cash" from "charge", will for brevity be called "recorders".

An important feature of our invention is that, in the larger installations, the number of recording devices required is much smaller than the considerable number of transmitting devices necessary to permit quick reports of sales to the central office. The maximum number of recording devices required is determined, principally, by the peak rate of transactions to be taken care of, and is not necessarily affected either by the number of transmitting devices or by the number of sub-divisions into which it is desired to segregate the information. The recording devices may be arranged in groups at the central office, and the selectors may be arranged to select the proper group and also to select an idle mechanism in that group.

In some cases, notably in small installations where the number of transmitters is not large, it may be preferable to omit the selective devices. It is, therefore, within the scope of our invention to use a direct connection between the transmitters and the punching-registering-recording-computing devices.

It will be understood from the following description that the punching-registering-recording-computing-device may be any one of several mechanisms, or any combination of them. Examples of appropriate recording or computing mechanism are cardpunching devices, listers, visual registers, totalizers, multiplying devices, devices for subtracting.

To the accomplishment of this object and such others as may hereinafter appear, as will readily be understood by those skilled in the art, the invention comprises the features and combinations of elements hereinafter described and then particularly pointed out in the appended claims.

The features and scope of the invention will best be understood from a description of the preferred embodiment thereof illustrated in the accompanying drawings, in which—

Figure 1 is a view, in plan, of a transmitting device that will be located on the sales floor and operated by the cashier. This view shows a set of identifying tags in place for feeding through the transmitter;

Fig. 2 is a view, in side elevation, of the transmitting device shown in Figure 1;

Fig. 3 is a view, in longitudinal vertical section, on the dotted line 3—3 of Fig. 1;

Figs. 4 and 5 are views, in transverse vertical section, on the dotted lines 4—4 and 5—5, respectively, of Fig. 3;

Fig. 6 illustrates a typical punched sales or recording tag;

Fig. 7 shows the wiring from a transmitter to a selective device, the notching mechanism of the selective device and, schematically, the connections leading to the punching-registering-recording-computing devices;

Fig. 8 shows a more complete wiring diagram;

Fig. 9 shows only the control wiring whereby the selector switches are operated; and Fig. 10 diagrammatically illustrates the general layout of the complete accounting system.

A description of the preferred embodiment of our invention as illustrated in the drawings, and a complete understanding of the purpose and scope of our invention, can best be understood by first following through the general operations necessary to the recording of a sale in a department store when using the embodiment of the invention illustrated in the drawings, and, second, by following through the detailed circuit operations of the apparatus involved.

Referring now to Fig. 10, a brief description of the procedure and operation will now be given.

Each article of merchandise to be sold has an inventory card and a merchandise display card punched in accordance with the requisite information (see Fig. 6). The inventory card is then placed in the inventory file while the merchandise display card accompanies the merchandise article to the proper sales department. This procedure is diagrammatically illustrated in the upper left hand corner of Fig. 10.

Each cashier and each sales clerk have punched identification cards and each customer having a charge account also has a punched identification card.

When a sale is made the merchandise card of the article sold, the clerk's card, and the cashier's card or charge customer's card are placed in the transmitter and when the transmitter is operated a selector switch automatically hunts for and finds an idle recorder. Electrical connections are then made over the full lines to cause the seized recorder to punch a new card and compute or print the information corresponding to the punched holes of the cards in the transmitter. The computed or printed record is made on a tape which is used to deplete the inventory file by removing the inventory card corresponding to the printed record. The new card punched by the selected recorder is termed a "sales audit and accounts receivable card" and is then run through a sorting and tabulating machine for determining the various sales by departments, cashiers, clerks, or articles as desired.

In Fig. 1, tag 16, which identifies the merchandise by serial number and price, has been removed from the article of merchandise sold, tag 18 is the identifying tag of the clerk making the sale, and also shows what department this clerk is stationed in, and tag 17 is the identifying tag of the cashier who registers the transaction. It will be understood that the punchings indicating the cashier's number, the type of transaction, and all other information to be transmitted to the central office, are standardized.

These three punched tags are placed on the receiving table of the transmitter in the sequence shown, and are clamped loosely in place by arms 19 and 20, which arms are held in their clamped position by latches 36 and 37. These arms are held at one end by pivots 38 and 39, and fastened to the arms are bearings 40 and 41 supporting a metal roller 10. The punched tags 16, 17 and 18 rest on a stationary bed-plate which forms the receiving table, but are slidably disposed thereon and are constrained to be moved forward toward the roll 10, by pairs of shoulders 30—31, 32—33, 34—35, and 55—56. These shoulders are movable in longitudinal marginal slots beside the bed-plate (see Fig. 5) and form a movable carriage for advancing the tags and are actuated by the movement of a rack 43 (Fig. 3). The four pairs of shoulders are supported by forked arms 44, 45 and 46, which, in turn, are supported slidably by ways in the form of rods 48 and 57 (Fig. 5). In mesh with rack 43 is pinion 49 supported by stationary bearing 50. A spring 51 tends to turn pinion 49 in a contra-clockwise direction, but the pinion is normally kept stationary by an escapement pawl 52. An electromagnet 54 and a spring 53 operate said pawl, so that when a pulse of current flows through the windings of the electromagnet 54, the entire carriage is stepped along one notch of the rack 43, carrying with it the punched tags 16, 17 and 18.

The selector device, shown best in Figs. 7, 8 and 9, consists of a shaft 70 supported by stationary bearings and carrying on it a set of wiper fingers 72 and a ratchet wheel 71; sets of stationary contacts 75 and 76; notching pawl 77 actuated by notching magnet 73 and returned to normal by spring 79; and holding and release pawl 78 held in the release position by spring 80 when magnet 74 is de-energized.

The punching-computing device shown in

Fig. 7 consists of an electromagnet 90 which, upon being energized, actuates an armature bar 91 pivoted at 93, depressing plunger 96 against the action of spring 99 and punching a hole in card 98, which lies over hole 97 in the bed-plate 100. At the same time, the action of armature bar 91 pulls down the pawl 94, and said pawl pulls down rack 95 of a computing machine. There is shown in Fig. 7 the mechanism for the control of only one digit in each of the recorders. Nine other similar mechanisms are present in the actual device, but this duplication is not shown in detail, as the construction is well known to those skilled in the art.

The function of a selector is to connect its transmitter to an idle recorder, and the means for accomplishing this can best be explained from the details of the selector circuits shown in Fig. 9. This figure represents schematically the control circuits for an installation of three transmitters with their rollers 10, 110 and 210, and three rotating selector switches with their shafts 70, 170 and 270 and their stepping-magnets 73, 173 and 273 and release-magnets 74, 174 and 274. Transmission is made to two recorders No. 1 and No. 2 as indicated by Fig. 7. Each selector switch has four positions. On each of these positions two contacts are used by the control circuits. These are the two contacts shown in each of the four positions. The thirteen other magnet circuit wires comprising ten digit and ten control wires for the punching-registering-recording-computing-devices, or recorders, are omitted in this view for the sake of clearness. Both recorders No. 1 and No. 2 (not shown in Fig. 9) are connected to the thirteen other contacts between contacts 104 and 108, 204 and 208, 304 and 308, that is, in the second position from the top of the stationary contacts of the selector switches which will be referred to as position No. 2, to the thirteen other stationary contacts of position No. 3 just below position No. 2, that is, between 105 and 109, 205 and 209, 305 and 309. The upper position of each selector is a home position, and the lower position is dead ended.

We will assume that none of the apparatus is being used and that a cashier inserts the three tags 16, 17 and 18 used in the present embodiment of the invention for recording a single sale, into the upper transmitter 10 (Fig. 9) and latches down the clamping arms 19 and 20 thereof, (see Fig. 1). This operation connects together the contacts from leads 122 and 123 through roller 10 (see Fig. 5) and completes a circuit from positive bus 124 through lead 123, roller 10, lead 122, release magnet 74 to negative bus 125. Referring now to Fig. 7, the energizing of the release magnet 74 brings ratchet 78 against the ratchet wheel 71 on shaft 70 of the rotating selector switch, in such a way as to prevent the return of said shaft and its attached parts in a contra-clockwise direction to the home or No. 1 position. At the same time another circuit is completed from positive bus 124, lead 123, roller 10, lead 122, stepping magnet 73, wiper 101, stationary contact 107, to negative bus 125. This energizes the stepping magnet 73 (see Fig. 7) and, by the action of the armature 79 and ratchet 77, shaft 70 with its attached parts is rotated to the second position.

Referring back to Fig. 9, wipers 101 and 102 will now be resting on stationary contacts 108 and 104, respectively. In this No. 2 position the circuit through the release magnet will still be complete, but the connection from the stepping magnet 73 through wiper 101, stationary contact 108, contact 115, armature 113 to busy-bus 119 will come to a dead end on the busy-bus, which merely leads to the stationary contacts 208 and 308 on the central and lower selectors shown in Fig. 9. Consequently, there will be no further stepping action, and the rotating wipers will remain in the second position, which connects the top transmitter with recorder No. 1. At the instant that selector switch shaft 70 moves over to position No. 2, wiper 102 comes into contact with stationary contact 104. In this position a circuit is established from negative bus 124, which energizes relay magnet 111 and causes armature 113 to be pulled over so that it makes contact with contact 114 and breaks contact with contact 115, thereby charging busy-bus 119 to a negative voltage. Busy-bus 119 is given a negative voltage by the connection running from negative bus 125 through wiper 102, contact 104, contact 114, armature 113 and busy-bus 119. The function of busy-bus 119, as will be seen, is to protect recorder No. 1 from being connected to another transmitter after it has already been seized or selected by one.

We will now assume that, while the upper transmitter is thus connected to recorder No. 1, the central transmitter of Fig. 9 comes into action. The latching down of the clamping arms on the central transmitter lowers its roller 110 so that contact is established by it with the brushes connected to leads 222 and 223. A circuit is completed through the release magnet 174 and so the holding ratchet comes into play as before. Another circuit is completed, as before, through stepping magnet 173, via positive bus 124, lead 223, roller 110, lead 222, stepping magnet 173, wiper 201, stationary contact 207, and negative bus 125. The energizing of stepping magnet 173 causes the rotating part of the central selector switch to notch over to the second position, in which position wipers 201 and 202 rest on stationary contacts 208 and 204, respectively. While the wipers are in this position the central transmitter is connected, for the moment, to recorder No. 1, but instantly another circuit is completed through the stepping magnet 173 via positive bus 124, lead 223, roller 110, lead 222, stepping magnet 173, wiper 201, stationary contact 208, contact 215, armature 213 to busy-bus 119, which is connected to the negative bus as already explained, through 113, 114, 104 and 102. This energizes the stepping magnet a second time, and causes the rotating part to move over another notch to position No. 3, in which position wipers 201 and 202 rest on contacts 209 and 205 respectively. While the wipers are in this position the connection from stepping magnet 173 through wiper 201, contact 209, contact 218 and armature 216 leads to busy-bus 120, which is not electrified, being connected only to open contacts 109 and 309. Consequently there is no further stepping impulse given to the notching magnet, and the wipers remain in the third position, which establishes contact between the central transmitter and the remaining recorder No. 2. In this position a circuit is established from negative bus 124, which energizes relay magnet 212 and causes armature 216 to be pulled over so that it makes contact with contact 217 and breaks contact with contact 218, thereby charging busy-bus 120 to a negative voltage.

It may be noticed that when wiper 202 rested momentarily on contact 204, a circuit was completed through relay magnet 211. However, this does not cause armature 213 to be actuated, because stepping magnet 173 is designed to be quicker acting than relay magnet 211, which latter magnet has around its iron core a short-circuited copper ring such as is commonly used to give slow pick-up action. All the auxiliary relay magnets 111, 112, 211, 212, 311, 312, are equipped with these short-circuited copper rings.

If now while both recorders No. 1 and No. 2 are busy, the operator of the lower transmitter brings it into action he is notified that all recorders are busy, as will be explained when the recorder control circuits are described. The operator of the lower transmitter, under this condition, then unlatches the clamping arms, which raises roller 210 from the brushes connected to leads 322 and 323. This opens the circuit of the release magnet 274 and allows the shaft 270 with its wipers to return to position No. 1 by the action of its return spring, in the same way that the de-energizing of magnet 74 (Fig. 7) allows spring 80 to pull ratchet 78 away from ratchet-wheel 71, leaving shaft 70 free to rotate in obedience to the force of the spring 156 which tends to rotate it contra-clockwise back to position No. 1.

Suppose now that the message to be transmitted to recorder No. 1 by the upper transmitter has been completed. The cashier operating the transmitter unlatches the clamping arms and removes the three tags. The raising of the clamping arms opens the circuit through release magnet 74, and shaft 70 with its wipers returns to position No. 1. Recorder No. 1 is now again idle. The circuit through relay magnet 111 is opened also, and armature 113 is pulled by its spring over against contact 115, breaking contact with 114. Busy-bus 119 is left connected only to open contact points 108, 208 and 308. If, after waiting a few moments, the cashier operating the lower transmitter again clamps down the arms 19 and 20 then, in the manner already explained in detail, the wipers on shaft 270 notch to the second position and, since busy-bus 119 is no longer electrified, they will remain there, establishing contact between the lower transmitter and recorder No. 1. Magnet 311 will be energized, and busy-bus 119 will be electrified again.

This completes the description of the detailed action of the selector devices and circuits which we preferably employ in the illustrated embodiment of our invention, but it is evident that any number of transmitters may be used, or any number of recorders, without the least change in the principles involved. One common battery 121 is used. Each transmitter is associated with its individual rotating selector switch. Each recorder is associated with its individual busy-bus, the function of which is to prevent a transmitter from being connected to a recorder that already is in use. Each recorder is connected to a plurality of stationary contacts on each selector switch. The number of recorders depends on the size of the installation, for example, in a large department store, the size of the floor space, number of cashiers, number of departments and other factors may indicate that one hundred transmitting mechanisms are desirable. The peak rate of sales may indicate that ten recording mechanisms will suffice. Then on each of the one hundred rotating line switches associated with the one hundred transmitters, there must be ten positions in addition to the home or first position. Spare or vacant positions may be provided for future expansion.

The operation of a transmitter and recorder which have been connected together by a line switch will now be described. The circuits are shown in Fig. 8. Shaft 70 of the selector switch has been rotated until its wipers are in contact with the row of stationary contacts of which 104 and 108 are the end contacts. The fifteen wipers, of which 102 and 101 are the two end wipers, are connected to the fifteen wires coming to the selector switch from the left in Fig. 8 by stationary arm 126 and fourteen other stationary arms below it. Operating magnet 90 and the other twelve operating magnets in the group with it are the operating magnets for a recording device well known to the art. Magnet 90 is shown in more detail in Fig. 7. Of the thirteen operating magnets shown for each recorder in Fig. 8, we use ten to control the ten digit-bars and the other three for other controls on the recorder, such as totalizer control, spacer control and non-add control.

In order to make clear the operation of a transmitter and recorder a concrete example will be used. We will suppose that a sale has been made for cash of a suit, which has been assigned a serial number 4271356 and price $78.96, by salesperson No. 2345 in Dept. 312, who turns the money in to cashier No. 6234. A tag 16, punched to record the serial number and price, is taken from the suit and the salesperson delivers this tag with the money and a similar tag 18, which has punched in it her own number "2435" and the department number "312" to the cashier. The cashier inserts these two tags, together with another tag 17 bearing her own number "6234" in her transmitter and clamps down the holding arms 19 and 20. The action of the selector circuits quickly establishes the connections shown in Fig. 8, in the manner already explained. The cashier then moves the carriage of the transmitter (see Fig 3) to the left as far as it will go against the action of spring 51 bringing the right-hand column in card 18 under the roller 10 and over the row of brushes beneath this roll (see Fig. 5). This is the card bearing first, the salesperson's number, and then the department number. On this card the hole punched in the first transverse column is in the position in that column which corresponds to digit 2; that is, the brush of the row below the roller 10 which makes contact through that hole is in the circuit which contains also the magnet which controls the printing, punching and computing machines by operating the digit 2 bar on them. Contact is established by the digit 2 brush projecting through this punched hole and touching the metal roller, but the wire from this brush leads through the contact controlled by the manually-operated digit 2 transmitter key, indicated by 21 on Fig. 8. The cashier depresses this digit 2 key manually, and a complete circuit is established from the positive side of battery 121 (Fig. 8) through winding 132 on stepping magnet 54 of the transmitter, through contact 15, through roller 10, through contact 13, through manually-operated key 21, through stationary arm 129 and its associated wiper on the rotating selector switch, through operating magnet 90 of the recording mechanism, to negative bus 130 and back to the negative side of battery 121. This current operates magnet 90, which provides the force and power to operate the recording devices provided. The same current flowing through winding 132 of magnet 54 actuates ratchet 52 (Fig. 3) and allows the spring 51 to force along the entire carriage and the punched tags one notch of the rack bars 43, by the agency of ratchet wheel 49. The next transverse column of the tag is thus brought automatically under the roller 10 and over the row of brushes, and in this next column the punched hole is in the digit 3 position. The same procedure is repeated, except the digit 3 key of the transmitter must be depressed by the cashier, and the recorder magnet controlling the bar for recording digit 3 is the one actuated. In this way each transverse punched row of the entire set of three tags is brought to rest between the roller and the row of brushes, and the information contained on the cards is reproduced by the recording device at the central office. After the tags have all passed through the transmitter, the cashier unlatches the holding arms 19 and 20, takes out the tags and returns the salesperson's identification tag to her.

It will be observed (see Fig. 1) that we have provided each tag with a complete series of holes punched in the two extreme positions of each column, so that brushes 11 and 15 will be in contact with roller 10 at each step of operation. Although all contacts are open during each forward step caused by the advance of the rack bar 43, the duration of this opening is so short that holding magnet 74 does not have time to release. The information to be transmitted is determined by the transverse position of the single other hole in the space between these extreme positions in each transverse column. The release of the holding arms at the end of the operation by the cashier raises the roller 10 and opens all contacts on the transmitter, including those at brushes 11 and 15. This removes the energizing current from the holding magnet 74 of the selector switch and permits the switch to return to its first or home position, ready again to select an idle recorder, and at the same time freeing the recorder just used so that it can be used by some other transmitter of the system.

As has been explained, when all the recording devices are in use or busy, the selector switch associated with the transmitter comming into use notches automatically around to the fourth position, Fig. 9. The stationary contacts in this position are not connected and consequently no circuit is completed when the brush on the transmitting device makes a contact through the punched hole in the first transverse column. The operator, noticing that her transmitter will not space along, releases the holding arms 19. After a short wait, she again clamps down the holding arms and if a recorder has in the meantime become idle, the transmitter is automatically connected to it in the manner already explained. This test is repeated as often as may be found necessary to find an idle recorder.

During normal operation of the transmitter, the step-by-step advance of the carriage is accomplished by energizing the magnet 54 by winding 132 (Fig. 8), which is the common return for all the digit and recorder control circuit brushes. Winding 131 normally has a current flowing through it, but this current flows also through winding 132 in the opposite direction, and so has no effect on the feed of the carriage.

During the time when the selection of an idle recorder is taking place an intermittent current flows from the positive side of battery 121 (Fig. 8) through winding 132 of magnet 54, brush 15, roller 10, brush 11, winding 131, stepping magnet 73 of the selector switch, wiper 101 (Fig. 9), stationary contact 107 (108 in the second position, 109 in the third position, etc.), and thence through negative bus 125 back to the negative side of battery 121. It will be noticed that the two windings on the notching magnet 54 of the transmitter are wound in opposite directions around the core, so that as heretofore stated, there is no net magnetizing effect on this core due to equal currents flowing in the two windings. This is necessary to prevent premature notching of the transmitter before an idle recorder has been selected.

In case of an absolutely simultaneous attempt to operate two transmitters, it is possible with the circuit we have described to have both of these transmitters connected to a single recorder. Those skilled in the art of electrical transmission will readily understand that the simple provision of properly connected interlocks on the auxiliary relays 111, 112, 211, 212, 311, 312 (Fig. 9) is within the scope of the invention and will prevent the operation of more than one of the sets of relays associated with a single recorder.

The system illustrated and described is, in our estimation, the simplest and most understandable embodiment whereby to explain the invention, but, as hereinbefore indicated, it may in some cases be desirable to segregate the recorders into definite groups, each group handling only a particular type of transaction, such as "cash" or "charge", and it is within the scope of the invention to change the electric circuits to effect an initial selection of the proper group previous to the automatic selection of an idle recorder in that group.

In the drawings we show a form of transmitting device that controls the making and breaking of electric circuits by means of brushes passing over holes in punched tags controlled by manually-controlled or key-operated contacts in series therewith, but it is to be understood that while the two sets of contacts in series are preferable, they are not essential, and we do not limit our invention to this type of transmitter.

It is highly desirable that a check be placed upon the cashier who transmits the record of the sale and it is for this reason that the duplex control of the transmitter is preferable. In the broader aspects of the invention either of these controls may be used separately or the transmission of any part of the information may be controlled by either a single or duplex control as may be found desirable.

In the illustrated embodiment of the invention we show a particular type of selective device, namely, a rotating line switch with an automatic notching arrangement, but it is to be understood that we do not limit our invention to this type of selective device since the skilled artisan may employ any one of several types of selectors without departing from our invention as defined by the appended claims.

It will be understood from the foregoing description that nothing herein contained is to be interpreted as limiting the invention in the scope of its application to use in connection with the particular system, or the particular mode of operation, or both, selected for purposes of illustration and explanation. While the particulars of construction and operation herein set forth are well suited to one commercial form of the invention, it is not limited to these details nor to the conjoint use of all its features, nor is it to be understood that these particulars are essential since they may be variously modified within the skill of the artisan without departing from the true scope of the actual invention, characterizing features of which are set forth in the following claims by the intentional use of generic terms and expressions inclusive of various modifications.

What is claimed as new, is—

1. In an automatic accounting system, a recorder at a record room, a circuit-controlling transmitter at another point, a plurality of electric circuits each for carrying a different signal indicating a different digit from the transmitter to the recorder, key-operated means at the transmitter, means responsive to the operation of said key-operated means for preparing all of said electric circuits, automatic means at the transmitter for selectively closing and completing only certain of said prepared circuits in a predetermined order to transmit only certain of said signals, and means for operating said recorder responsive to the completion of said circuits for reproducing the transmitted signals at the record room in the order of their transmission.

2. In an automatic accounting system, a recorder at a record room, a circuit-controlling transmitter at another point, a plurality of electric circuits each for carrying a different signal from the transmitter to the recorder, automatic means at the transmitter for controlling the order in which said circuits are closed in accordance with a predetermined series of signals to be transmitted and recorded by said recorder, and manually controlled means for closing said circuits in accordance with said automatic means.

3. In an automatic accounting system, a circuit-controlling transmitting device, a plurality of electric circuits controlled by said transmitting device and leading from it to a recording device controlled by said circuits, means for automatically closing portions of said circuits in a prearranged order, and means at the transmitter for selectively closing said circuits in a pre-arranged order.

4. In an electrically-controlled accounting system, a circuit-controlling device comprising a transmitter having a key-operated mechanism for sending signals, each key being adapted to energize an electric circuit, a plurality of punched cards, means controlled by the operation of said keys for feeding said plurality of punched cards through the transmitter, successive punchings in said cards, and means including said punchings for selectively preparing the circuits in the same definite order that determines the order of operation of the keys for any predetermined set of signals.

5. In an electrically-controlled accounting system, a circuit-controlling device comprising a transmitter, a plurality of electric circuits leading from said transmitter, and means for feeding in a single cycle of operation a plurality of punched cards through the transmitter the successive punchings whereof select and close said circuits in a pre-arranged order to punch a single card in accordance with the punchings on said plurality of cards.

6. In an electrically-controlled accounting system, a circuit-controlling device comprising a transmitter, a plurality of electric circuits leading from said transmitter, means for feeding in a single cycle of operation a plurality of punched cards step-by-step through the transmitter, and a plurality of contacts for closing said circuits of which a single one is selected for closing a circuit at each advance of the punched card for controlling the next step of the cards through the transmitter.

7. In a remote-controlled recording system, circuits, two sets of contacts in series for controlling the closure of said circuits, a set of brushes, means controlled by the perforations in a plurality of punched cards by the passage of such cards past said set of brushes for selectively controlling the contacts in one of said sets, and a manually-operated keyboard for controlling the contacts of the other set.

8. In a remote-controlled recording system of the class described, circuits, two sets of contacts in series for controlling the closure of said circuits, a set of brushes, means controlled by the holes in a plurality of punched cards when passed by said set of brushes for controlling the contacts in one of said sets, and manual means for controlling the other set.

9. An automatic accounting system, comprising in combination a plurality of circuit-controlling transmitters, a group of centrally-located selectors, electrical connections between said transmitters and said selectors, a plurality of card-punching mechanisms smaller in number than the number of said transmitters, electrical connections between said selectors and said card-punching mechanisms, means associated with the first-mentioned electrical connections for causing a selector to select an idle punching machine, punched-card controlled means also associated with the first-mentioned electrical connections for sending impulses over said connections after the same have been connected to an idle punching machine, means for stepping the contact point on punched cards at one of said transmitters to the succeeding column as the message on a given column is sent, means for releasing a punching machine by a selector after a message has been sent, means associated with the last mentioned electrical connections for determining whether a given punching apparatus is busy, and means for establishing electrical connection between a transmitter and a punching machine only when the latter is idle.

10. In an accounting system, a plurality of recorders, a plurality of punched cards, a plurality of transmitters adapted for holding the punched cards, and means including selecting devices responsive to the placing of punched cards in one of said transmitters for automatically selecting an idle one of said recorders to connect said recorder to the transmitter in use.

11. In an accounting system, a plurality of recorders, a plurality of punched cards, a plurality of transmitters adapted for holding the punched cards, means including selecting devices responsive to the placing of punched cards in one of said transmitters for automatically selecting an idle one of said recorders to connect said recorder to the transmitter in use, and means for transmitting electrical impulses over the established connection from said transmitter to said recorder in accordance with the punched information on said cards.

12. In an accounting system, a plurality of recorders, a plurality of punched cards, a plurality of transmitters adapted for holding the punched cards, means including selecting devices responsive to the placing of punched cards in one of said transmitters for automatically selecting an idle one of said recorders to connect such recorder to the transmitter in use, means for transmitting electrical impulses over the established connection from said transmitter to said recorder in accordance with the punched information on said cards, and means in said recorder responsive to said transmitted impulses for punching a blank card.

13. In an accounting system, a plurality of recorders, a plurality of punched cards, a plurality of transmitters adapted for holding the punched cards, means including selecting devices responsive to the placing of punched cards in one of said transmitters for automatically selecting an idle one of said recorders to connect such recorder to the transmitter in use, and means for preventing the connection of said transmitter with a recorder in case all said recorders are busy.

14. In an accounting system, a plurality of recorders, a plurality of punched cards, a plurality of transmitters adapted for holding the punched cards, means including selecting devices responsive to the placing of punched cards in one of said transmitters for automatically selecting an idle one of said recorders to connect such recorder to the transmitter in use, means for preventing the connection of said transmitter with a recorder in case all said recorders are busy, and circuit arrangements responsive to one of said busy recorders becoming idle for rendering said preventing means ineffective.

15. In an accounting system, a plurality of transmitters, a plurality of recording devices, a plurality of cards, circuits, means in each transmitter for closing said circuits in accordance with the cards placed therein, means responsive to the closure of certain of said circuits for automatically connecting the transmitter in use with an idle recording device, and means responsive to the closure of other of said circuits to operate the recorder in accordance with said cards.

16. In an accounting system, a plurality of transmitters, a plurality of recording devices, a plurality of cards, circuits, means in each transmitter for closing said circuits in accordance with the cards placed therein, a selector switch individual to each transmitter, and means responsive to the closure of said circuits for first operating the selector individual to the transmitter in use to select an idle one of said recording devices and then to automatically operate the seized recording device in accordance with the cards in said transmitter.

17. In an electrically operated accounting system, the combination with a plurality of punched cards, a punched card transmitter having means for closing a plurality of circuits successively in accordance with the punchings on the cards, a plurality of recorders adapted to be operated in accordance with the closed circuits, together with automatic selecting devices responsive to the closure of certain of said circuits for automatically selecting an idle recorder and connecting such recorder to the transmitter in which the cards have been placed.

18. In an automatic accounting system, the combination with a plurality of circuit closing transmitters, a plurality of cards having punchings therein, a plurality of punching devices less in number than the transmitters, a selector for each transmitter, means responsive to the placing of one of said punched cards in one of said transmitters for causing its associated selector to select an idle punching device and complete electrical connections therewith, and means including electric circuits controlled by the punchings in the card in the transmitter to cause said selected punching device to punch a blank card in accordance with the punchings of the card in the transmitter.

19. In an automatic accounting system, the combination with a plurality of circuit closing transmitters, a plurality of cards having punchings therein, a plurality of punching devices less in number than the transmitters, a selector for each transmitter, means responsive to the placing of one of said punched cards in one of said transmitters for causing its associated selector to select an idle punching device and complete electrical connections therewith, means including electric circuits controlled by the punchings in the card in the transmitter to cause said selected punching device to punch a blank card in accordance with the punchings of the card in the transmitter, and means for delaying the closure of said electric circuits in case the associated selector is unable to find and connect with an idle punching device.

20. In an accounting system, the combination with merchandise display cards for articles for sale, said cards having punchings corresponding to the associated articles and their sale prices, a plurality of groups of punching-recording devices, a plurality of transmitters, means responsive to the insertion of one of said cards in one of said transmitters when the corresponding article is sold for automatically connecting an idle one of said groups of devices with said transmitter, and means including electrical circuits controlled by the punchings in said card in said transmitter for causing said selected group to register the sale and to punch another card in accordance with the punchings in the first card.

21. In an accounting system, a plurality of different cards each having punchings therein designating specific information, a transmitter designed to hold said plurality cards, a punching machine, and means responsive to the insertion of said cards in said transmitter for operating said machine to punch a single card in accordance with the punchings on said plurality cards.

22. In an accounting system, a transmitter, a plurality of recorders, a selective device, a plurality of cards having different punchings, and means in said transmitter responsive to the placing of said plurality of cards in said transmitter to first operate said selecting device to select an idle recorder and to then operate the selected recorder to produce a single record of the punched information on said plurality of cards.

23. In an accounting system, a plurality of cards having punches therein, a circuit-controlling transmitter adapted for use with said cards, a plurality of circuits leading from said transmitter, a plurality of contacts in said transmitter for closing said circuits, a selecting device, a plurality of recorders, means controlled by a punching in one of said cards when placed in said transmitter for selecting one of said contacts to close its associated circuit, means responsive to such circuit closure for causing said selecting device to automatically select and connect said transmitter with an idle recorder, and means controlled by the other punchings in said card for selecting others of said contacts to close their associated circuits, and means responsive to such circuit closures for operating said selected recorder in accordance with said other punchings.

24. In an accounting system, a circuit-controlling device comprising a step-by-step transmitter, a plurality of electric circuits leading from said transmitter, a plurality of contacts for closing said circuits, a plurality of cards having punchings therein, means controlled by a punching in one of said cards for selecting one of said contacts to close its associated circuit, means controlled by the closure of said circuit for advancing said transmitter one step, and means controlled by the advance of said transmitter for causing another punching in said card to select the same or another of said contacts whereby such contact closes its associated circuit to cause the transmitter to take another step.

25. In an accounting system, a circuit-controlling device comprising a step-by-step transmitter, a plurality of electric circuits leading from said transmitter, a plurality of contacts for closing said circuits, a plurality of cards having punchings therein, means controlled by a punching in one of said cards for selecting one of said contacts to close its associated circuit, means controlled by the closure of said circuit for advancing said transmitter one step, means controlled by the advance of said transmitter for causing another punching in said card to select the same or another of said contacts whereby such contact closes its associated circuit to cause the transmitter to take another step, and means for stopping the step-by-step advance of said transmitter in case said contacts fail to encounter further punchings in said card.

26. In an accounting system, a plurality of transmitters located at various sales departments in a department store, merchandise cards on articles for sale having punchings for indicating the article code number and sales price, cashiers' cards having punchings for indicating each cashier's number, clerks' cards having punchings for indicating each clerk's number, punching devices located in a record room, means responsive to the placing of a merchandise card, a cashier's card and a clerk's card in one of said transmitters at the time of a sale for automatically selecting an idle punching device, and means including electric circuits controlled by the punchings in said cards for operating the selected punching device to punch a blank card with punchings indicating the article code number, the sales price, the cashier's number, and the clerk's number whereby a complete record of the sale is available at the record room practically simultaneously with the sale of the article.

27. In an accounting system, a plurality of transmitters located at various sales departments, merchandise cards on articles for sale having punchings for indicating the article code number and sales price, customers charge account cards having punchings for identifying each customer by number, punching devices located in the accounting room, means responsive to the placing of a merchandise card and the customer's card in one of said transmitters when an article is sold and is to be charged for automatically selecting an idle punching device, and means including electric circuits controlled by the perforations in said cards for operating the selected punching device to punch a blank card with punchings indicating the article code number, the sales price, and the customer's number whereby a complete record of the sale and "charge" is made in the accounting room practically simultaneously with the sale of the article.

28. In an accounting system, merchandise display cards and corresponding inventory cards having punchings therein corresponding to the articles and their sales prices, the inventory cards being placed in an inventory file while the display cards are associated with the article for sale, a plurality of groups of punching-recording devices adapted to punch sales audit and accounts receivable cards and adapted to make registrations of sales, a plurality of transmitters arranged to receive the display cards when the corresponding articles are sold, means responsive to the insertion of one of said display cards in one of said transmitters for causing an idle one of said groups of devices to be automatically and electrically connected with said transmitter, and means including electrical circuits controlled by the punchings in said display card in the transmitter to cause said selected group to punch a sales audit and accounts receivable card from which the customer's bill is made and to cause a registration of the sale from which a person receiving the same may delete the inventory file in accordance therewith.

29. In an accounting system wherein inventory cards and merchandise display cards are punched for each article of merchandise, in which the inventory cards are filed in an inventory file while the display cards are associated with the article for sale, and in which a plurality of groups of punching-recording devices are adapted to punch sales audit and accounts receivable cards and adapted to make registrations of sales, a plurality of transmitters greater in number than said groups of devices, means responsive to the placing of a merchandise display card in one of said transmitters for automatically connecting an idle one of said groups with said transmitter, and means including electrical circuits controlled by the punchings in said display card in the transmitter to cause said selected group of devices to register the sale and to punch a corresponding sales audit and accounts receivable card at the time of the sale of the article whereby the person receiving the said registration may delete the inventory file in accordance therewith.

In testimony whereof, we have hereunto subscribed our names this 24th day of June, 1926.

EDWARD ROGAL.
LOUIS FRANK WOODRUFF.